(12) United States Patent
Kim et al.

(10) Patent No.: US 9,096,925 B2
(45) Date of Patent: Aug. 4, 2015

(54) NANOCOMPOSITES CONSISTING OF CARBON NANOTUBE AND METAL AND A PROCESS FOR PREPARING THE SAME

(75) Inventors: Jae Ha Kim, Daejeon (KR); Kug Jin Yun, Daejeon (KR); Myung Kuk Jin, Daejeon (KR)

(73) Assignee: BIONEER CORPORATION, Daejeon (KR)

( * ) Notice: Subject to any disclaimer, the term of this patent is extended or adjusted under 35 U.S.C. 154(b) by 162 days.

(21) Appl. No.: 12/994,548

(22) PCT Filed: Sep. 26, 2008

(86) PCT No.: PCT/KR2008/005712
§ 371 (c)(1),
(2), (4) Date: Nov. 24, 2010

(87) PCT Pub. No.: WO2009/145393
PCT Pub. Date: Dec. 3, 2009

(65) Prior Publication Data
US 2011/0081546 A1    Apr. 7, 2011

(30) Foreign Application Priority Data

May 28, 2008 (KR) .................. 10-2008-0049464

(51) Int. Cl.
*C09K 3/00* (2006.01)
*B82Y 30/00* (2011.01)
(Continued)

(52) U.S. Cl.
CPC ........... *C23C 18/1676* (2013.01); *B22F 1/0022* (2013.01); *B22F 1/025* (2013.01);
(Continued)

(58) Field of Classification Search
CPC .... B22F 1/0022; B22F 1/025; B22F 2999/00; B22F 9/24; B82Y 30/00; B82Y 40/00; C01B 31/0253; C01B 31/0273; C23C 18/02; C23C 18/10; C23C 18/1658; C23C 18/1676; C23C 18/31; Y10T 428/2927
USPC ........... 428/372; 252/182.32, 182.33, 182.35; 977/748, 773, 788, 847, 896
See application file for complete search history.

(56) References Cited

U.S. PATENT DOCUMENTS 6,426,134 B1   7/2002 Lavin et al.
6,908,261 B2   6/2005 Hannay et al.
(Continued)

FOREIGN PATENT DOCUMENTS

JP   08-325195    12/1996
KR   10-0616071    8/2006
(Continued)

OTHER PUBLICATIONS

Lee, et al., Assembly of Metal Nanoparticle-Carbon Nanotube Composite Materials at the Liquid/Liquid Interface, Langmuir 2006; 22: 1817-1821.*

(Continued)

*Primary Examiner* — Daniel C McCracken
(74) *Attorney, Agent, or Firm* — Clark & Brody

(57) ABSTRACT

The present invention relates to a method for preparing a nano-composite comprising carbon nanotube and metal, more precisely a method for preparing a carbon nanotube-metal composite comprising the steps of preparing a dispersion solution by dispersing carbon nanotube in a reductive solvent; preparing a mixed solution by adding a stabilizer and a metal precursor; and reducing the metal precursor by heating the mixed solution, and a carbon nanotube-metal composite prepared by the same.

The method of the present invention favors the production of a carbon nanotube-metal composite which is characterized by even metal particles from some nm to hundreds nm in size and even dispersion of those particles to be bound to carbon nanotube.

10 Claims, 3 Drawing Sheets

(51) Int. Cl.
- *B82Y 40/00* (2011.01)
- *C23C 18/16* (2006.01)
- *B22F 1/00* (2006.01)
- *B22F 1/02* (2006.01)
- *C01B 31/02* (2006.01)
- *C23C 18/08* (2006.01)
- *C23C 18/10* (2006.01)
- *C23C 18/31* (2006.01)

(52) U.S. Cl.
CPC ............... *B82Y 30/00* (2013.01); *B82Y 40/00* (2013.01); *C01B 31/0253* (2013.01); *C01B 31/0273* (2013.01); *C23C 18/08* (2013.01); *C23C 18/10* (2013.01); *C23C 18/1658* (2013.01); *C23C 18/31* (2013.01); *B22F 2999/00* (2013.01); *Y10T 428/2927* (2015.01)

(56) References Cited

U.S. PATENT DOCUMENTS

| | | | |
|---|---|---|---|
| 7,153,903 | B1 | 12/2006 | Barazza et al. |
| 8,211,472 | B2* | 7/2012 | Okumura et al. ............. 424/489 |
| 2008/0248648 | A1* | 10/2008 | Thompson et al. ........... 438/681 |
| 2009/0264561 | A1* | 10/2009 | Carlson ............................ 524/68 |

FOREIGN PATENT DOCUMENTS

| | | |
|---|---|---|
| KR | 10-0778094 | 11/2007 |
| KR | 10-195840 | 1/2009 |
| WO | WO 2007/050408 * | 5/2007 |

OTHER PUBLICATIONS

"Glycol Ethers," accessed online at http://www.cdph.ca.gov/programs/hesis/Documents/glycols.pdf on Sep. 26, 2014.*
Product Safety Assessment Ethylene Glycol Butyl Ether, accessed online at: http://msdssearch.dow.com/PublishedLiteratureDOWCOM/dh_0460/0901b80380460e43.pdf?filepath=productsafety/pdfs/noreg/233-00261.pdf&fromPage=GetDoc on Sep. 26, 2014.*
P.J.F. Harris, "Carbon Nanotube Composites" International Materials Reviews, 2004, vol. 49, No. 1, pp. 31-43.
Lu et al., "Effect of . . . ruthenium nanoparticles", Carbon, Elsevier, oxford, GB, vol. 45, No. 8, Jun. 29, 2007, pp. 1599-1605 XP022134860.
Zhang X et al., "Preparation and . . . heating method", Materials Letters, North Holland Publishing Co., Amsterdam, NL, vol. 62, No. 15, Dec. 4, 2007, pp. 2343-2346, XP025799894.
Database Inspec, Online Mar. 2006, Zhenyu Sun et al., "Synthesis of . . . supercritical methanol", Database accession No. 8981642 XP002670525.
F. Bonet, V. "Synthesis of . . . ethylene glycol", Nanostructured Materials, vol. 11, No. 8, May 19, 2000, pp. 1227-1284, XP002670526.

* cited by examiner

NANOCOMPOSITES CONSISTING OF CARBON NANOTUBE AND METAL AND A PROCESS FOR PREPARING THE SAME

TECHNICAL FIELD

The present invention relates to a nanocomposite consisting of carbon nanotube and metal and a method for preparing the same, more precisely a carbon nanotube-metal composite in which metal particles from some nm to hundreds nm are dispersed evenly in carbon nanotube and particularly metal particles are bound regularly according to the size and a method for preparing the same.

BACKGROUND ART

Recently discovered carbon nanotube has a great possibility of application in a variety of fields including energy industry, environmental and electronic materials, owing to its excellent mechanical strength, thermal conductivity, electrical conductivity and chemical stability. In 1991, Dr. Lijima of NEC, Japan, studied carbon mass formed on negative electrode by arc-discharge under TEM, during which he fount out a long thin rod shaped carbon nanotube and later on he published a paper on this in Nature, which was the first report of carbon nanotube. Carbon nanotube is that graphite side is rolled with nano-size diameter and according to the angle and structure of this rolled graphite side, it shows the characteristics of metal or semiconductor. Carbon nanotube is expected not only as a novel medical material owing to its affinity to biotissues but also as an applicable material for ultrafine link, ultrafine pipe, ultrafine liquid injection device, and gas sensor. Studies on the application of carbon nanotube as electron emission source and field emission display (FED) are most actively undergoing. Besides, studies on the application of carbon nanotube as a raw material for fuel cell and secondary cell, expected as alternative energy source, and as a bulk material requiring light weight but high strength are also actively undergoing.

Carbon nanotube-metal composite is a novel material which is applicable as a material in the field of electronic industry, precisely as an electrode material for field emission display, fuel cell and solar cell, for hydrogen storage device of fuel cell, for electromagnetic interference shielding device and as a raw material for electronic ink.

This composite is also expected to be a new enhanced material having light weight but high strength so that it is applicable to high strength lightweight tool steels and automobile parts, and as a material for defense industry.

Carbon nanotube-metal composite is a novel material prepared by inducing functional group in carbon nanotube and by reacting the induced functional group with a metal (Co, Cu, Ni, etc). Owing to the metal component included therein, the composite demonstrates excellent properties favoring various application, for example the productions of field emission display, hydrogen storage device assembly, electrode, super capacitor, electromagnetic interference shielding device, and high strength light weight applied product. If a metal particle to be bound is in nano-size, the metal properties are changed. The most peculiar change in physical properties of metal is decrease of melting point. And the melting point is further lowered as the size of nano-metal particle becomes smaller. Accordingly, the carbon nanotube composite has different properties from the conventional materials, providing diverse applicability as a novel material:

According to the request of a novel material, a carbon nanotube-metal composite is developed by physical mixing and sintering carbon nanotube with a metal (P. J. F. Harris, International Materials Reviews, Vol 49, p31-43, 2004).

However, in this composite, metal is not bound to carbon nanotube and dispersed irregularly with forming lumps, making this composite less favorable as a novel material. Recently there has been another attempt to prepare a composite by binding metal chemically to carbon nanotube. But, in this method, the metal covers the whole carbon nanotube, so that characteristics of carbon nanotube are buried.

In the meantime, Korean Patent No. 616071 and No. 778094 describe a method for reducing a metal precursor by using a reducing agent in carbon nanotube dispersing solvent. However, the above patents also have a problem that reduction by the added reducing agent does not occur regularly in the reaction solution, so that the produced carbon nanotube-metal composite has poor dispersibility and irregularity in metal particle size.

DISCLOSURE

Technical Problem

It is an object of the present invention to provide a carbon nanotube-metal composite in which metal particles from some nm to hundreds nm are dispersed evenly in carbon nanotube and particularly metal particles are bound regularly according to the size and a method for preparing the same.

It is another object of the present invention to provide a method for preparing a carbon nanotube-metal composite in which the size of a metal particle to be bound to carbon nanotube is controlled as smaller and evener so that the metal nano particles are more evenly dispersed and bound to carbon nanotube.

Technical Solution

After all the studies to achieve the above object, the present inventors confirmed that an enhanced carbon nanotube-metal composite could be produced by the method comprising the steps of dispersing carbon nanotube in a reductive solvent selected from the group consisting of polyol, glycol ether or a mixture thereof; and adding a stabilizer and a metal precursor, followed by heat treatment to disperse the reduced metal particles evenly on carbon nanotube. In particular, the added stabilizer could increase stability of metal particles during the formation of metal particles by reducing the metal precursor, suggesting that the metal particles can be formed more regular in size, compared with the metal particles produced without a stabilizer. This result indicates that the size of a metal particle can be controlled by using a stabilizer.

The reductive solvent in this invention plays a role in dispersing carbon nanotube and reducing a metal precursor. The reductive solvent selected from the group consisting of polyol, glycol ether and a mixture thereof has a moderate reducing power, suggesting that reduction proceeds at a proper speed so that regular sized metal particles can be produced and at the same time coagulation of metal particles can be inhibited, resulting in even dispersion of metal particles in a carbon nanotube-metal composite. The mixed solvent comprising polyol and glycol ether increases dispersibility of the reduced metal particles.

Hereinafter, the present invention is described in detail.

The present invention relates to a carbon nanotube-metal composite and a method for preparing the same. The method of the present invention is characteristically composed of the following steps:

Preparing a dispersion solution by dispersing carbon nanotube in a reductive solvent;

Preparing a mixed solution by adding a stabilizer and a metal precursor; and

Reducing the metal precursor by heating the mixed solution.

In the method of the present invention, the carbon nanotube includes all of single wall carbon nanotube, double wall carbon nanotube, thin multi-wall carbon nanotube and multi-wall carbon nanotube.

The method to bind a metal to carbon nanotube of the present invention is as follows. Commercial carbon nanotube has a defect site on its surface. This defect site contains an anionic functional group such as carboxyl group induced during the purification of carbon nanotube (M. W. Marshall et al., Carbon, Vol 44, p 1137-1141, 2006). In the production of carbon nanotube by chemical vapor deposition (CVD), a metal catalyst used has to be eliminated. In general, this metal catalyst is melted with hydrochloric acid or nitric acid during purification for elimination. At this time, carbon nanotube also contacts with acid. The acid then induces carboxyl group on the surface of carbon nanotube. So, if more functional groups are required on carbon nanotube, a strong acid can be treated thereto to induce more carboxyl groups. When carbon nanotube having an anionic functional group such as carboxyl group contacts with metal salt dissolved in liquid, the dissolved cationic metal is bound to carboxyl group as a precursor form. If reduction is induced using a reducing agent with raising temperature, the reduced metal is bound to carbon nanotube to form a carbon nanotube-metal composite. A stabilizer in the mixed solution along with a metal precursor is bound to cationic metal and the reduced metal to control reaction speed for stable reduction of metal and to prevent coagulation of metal particles. Unlike the case with no stabilizer, the addition of a stabilizer results in more regular dispersion of smaller and evener metal particles in carbon nanotube.

In this method, the stabilizer can be selected from the group consisting of surfactants, hydrophilic polymers, amines and a mixture thereof. The size of a metal particle depend on the amount of a stabilizer. The amount of a stabilizer is not necessarily limited but considering the size of a metal particle and economic efficiency of the final composite product, the preferable weight ratio of stabilizer to metal precursor is 1:0.01~50 and 1:0.05~20 is more preferred.

In the case that a mixture of hydrophilic polymer and amine is used as a stabilizer, the size of a metal particle produced by reduction can be regulated as smaller. The size of a metal particle generally produced in the presence of a stabilizer is up to 200 nm and more preferably 5-200 nm. And, when a mixture of hydrophilic polymer and amine is used as a stabilizer, the size of a metal particle is up to 100 nm and more preferably up to 50 nm.

Hereinafter, the method for preparing a carbon nanotube-metal composite of the present invention is described in detail, step by step.

First, to produce a carbon nanotube-metal composite, a dispersion solution is prepared by dispersing carbon nanotube in a reductive solvent. In general, carbon nanotube is added to an organic solvent, to which a reducing agent is added to induce reduction. However in this invention, an economical reducing agent is selected as a solvent, in which a metal is completely reduced by neat reduction. Sodium borohydride and hydrazine have been known as a general reducing agent. But, these reducing agents increase production costs because of high price, even if they demonstrate excellent reducing power.

In this invention, less expensive polyol, glycol ether or a mixture thereof is selected to play a role as a solvent and at the same time as a reducing agent, resulting in the decrease of production costs. That is, the method of the present invention does not require an additional reducing agent, so that it not only is simple in processes but also brings the effect of better dispersion of metal particles in carbon nanotube since the reducing agent used as a solvent herein has moderate reducing power, suggesting that reduction is induced at a proper regular speed to generate even metal particles from some nm to hundreds nm. Besides, the shape of metal particle thereby is all round, suggesting the metal particles have a morphological regularity.

The reductive solvent preferably used in this invention is polyol, glycol ether or a mixture thereof. The polyol herein is a compound having at least 2 hydroxyl groups (—OH), which is selected from the group consisting of glycol represented by formula 1, glycerin, threitol, arabitol, glucose, mannitol, galactitol and sorbitol. Among these, glycol is more preferred. The glycol ether herein has the substitution of one or more hydroxyl groups with alkyl or aryl alkyl carbonyl, which is represented by formula 2. And, glycol ether having one hydroxyl group is preferred. A compound having high melting point such as threitol, arabitol, glucose, mannitol, galactitol and sorbitol is preferably used together with a reductive solvent having low melting point.

H—(OR$^1$)$_n$—OH [Formula 1]

R$^4$—(OR$^2$)$_m$—OR$^3$ [Formula 2]

(Wherein, R$^1$ and R$^2$ are independently C$_2$~C$_{10}$ straight or branched alkylene; R$^3$ is hydrogen atom, allyl, C$_1$~C$_{10}$ alkyl, C$_5$~C$_{20}$ aryl or C$_6$~C$_{30}$ aralkyl; R$^4$ is allyl, C$_1$~C$_{10}$ alkyl, C$_5$~C$_{20}$ aryl, C$_6$~C$_{30}$ aralkyl or C$_2$~C$_{10}$ alkylcarbonyl; alkyl of the alkylcarbonyl can include double bond in its carbon chain; and n and m are independently integers of 1-100.)

The glycol compound is exemplified by ethylene glycol, diethylene glycol, triethylene glycol, tetraethylene glycol, polyethylene glycol, propylene glycol, dipropylene glycol, polypropylene glycol, hexylene glycol, etc. Among these, ethylene glycol and triethylene glycol are more preferred, but not always limited thereto.

The glycol ether compound is exemplified by methyl glycol, methyl diglycol, methyl triglycol, methyl polyglycol, ethyl glycol, ethyl diglycol, butyl glycol, butyl diglycol, butyl triglycol, butyl polyglycol, hexyl glycol, hexyl diglycol, ethyl hexyl glycol, ethyl hexyl diglycol, allyl glycol, phenyl glycol, phenyl diglycol, benzil glycol, benzil diglycol, methyl propylene glycol, methyl propylene diglycol, methyl propylene triglycol, propyl propylene glycol, propyl propylene diglycol, butyl propylene glycol, butyl propylene diglycol, phenyl propylene glycol, methyl propylene glycol acetate, etc, but not always limited thereto.

Using a mixed solvent of polyol and glycol ether compound as a reductive solvent in this invention favors regularity of metal particle sizes and dispersibility of the metal particles in a carbon nanotube-metal composite. In addition, using such a mixed solvent also favors the production of even round shaped particles. At this time, glycol is preferably selected among polyols to make a mixed solvent with glycol ether. It is more preferred to mix glycol and methyl polyglycol to prepare a mixed solvent.

In the method of the present invention, to disperse carbon nanotube in a reductive solvent, any conventional method known to those in the art can be used, but sonication is preferred because it is easy and favors dispersion. Carbon nanotube is generally tangled at the time of purchase, which can be observed under electron microscope. This tanglement can be a barrier for even dispersion of metal particles. So, it has to be treated during the production of a carbon nanotube-metal composite.

The second step of the method of the present invention is to prepare a mixed solution by adding a stabilizer and a metal precursor to the carbon nanotube dispersed solution.

The metal precursor herein is selected from the group consisting of compounds containing a metal component or a mixture thereof. The metal component herein is not limited and can be selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Al, Ga, In, Sn, Tl, Pb and Bi. So, a compound containing any of those metals or a mixture of the compounds can be used in this invention.

In the method of the present invention, the metal precursor can be an inorganic metal salt such as hydroxyl compound, carbonate compound, chloride compound and nitrate compound. The organic metal complex compound is exemplified by carboxylate compound represented by formula 3, β-diketonate compound represented by formula 4, their hydrates or a mixture thereof.

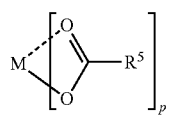
[Formula 3]

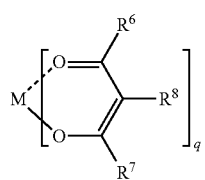
[Formula 4]

(Wherein, M is selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Al, Ga, In, Sn, Tl, Pb and Bi; $R^5$, $R^6$ and $R^7$ are independently allyl, $C_1$~$C_{10}$ alkyl, $C_5$~$C_{20}$ aryl or $C_6$~$C_{30}$ aralkyl; $R^8$ is hydrogen atom or $C_1$~$C_7$ alkyl; and p and q are independently atomic value of M.)

Metal component (M) of the metal salt is preferably selected from the group consisting of Ag, Mn, Al and Zn. The metal precursor compound is exemplified by silver nitrate, silver acetylacetonate, silver acetate, silver carbonate, silver chloride, aluminum hydroxide, aluminum chloride, aluminum acetylacetonate, aluminum acetate, aluminum nitrate, manganese carbonate, manganese chloride, manganese nitrate, manganese acetylacetonate, manganese acetate, zinc chloride, zinc nitrate, zinc acetate, zinc acetylacetonate or their hydrates, but not always limited thereto.

As explained hereinbefore, a stabilizer is added to increase stability of the metal precursor and metal particles generated by reduction of the metal precursor to control reduction speed and to prevent coagulation of the generated metal particles, which suggests that the stabilizer plays a role in regulation of the sizes of metal particles to be smaller and more regular. The stabilizer herein can be selected from the group consisting of surfactants, hydrophilic polymers, amines and a mixture thereof, and particularly a mixture of a hydrophilic polymer and an amine compound is preferred.

The surfactant herein can be selected from the group consisting of non-ionic surfactants, cationic surfactants, anionic surfactants and a mixture thereof. The non-ionic surfactant herein is exemplified by polyoxyethylene decyl ether, polyoxyethylene lauryl ether, polyoxyethylene cetyl ether, polyoxyethylene oleyl ether, polyoxyethylene stearyl ether, polyoxyethylene octyl decyl ether, polyoxyethylene tridecyl ether, polyoxyethylene nonylphenol ether, polyoxyethylene octylphenol ether, polyoxyethylene phenyl ether, polyoxyethylene sorbitan ester, sorbitan monolaurate, sorbitan monopalmitate, sorbitan monostearate, sorbitan trioleate, polyoxyethylene glycol, polyoxyethylene oleyl ester, etc. The cationic surfactant herein is exemplified by dodecyl ammonium chloride, cetyltrimethylammonium bromide, alkylammonium methosulfate, alkyl dimethyl ammonium chloride, etc. The anionic surfactant herein is exemplified by sodium stearate, sodium laurate, sodium palmitate, potassium stearate, potassium laurate, potassium palmitate, sodium lauryl sulfate, sodium dodecylbenzene sulfonate, etc, but not always limited thereto.

The hydrophilic polymer herein is selected from the group consisting of polyethylene glycol, polyvinyl alcohol, polyacrylic acid, polymethacrylic acid, polyacrylamide, polyvinyl sulfonic acid, polydiallyl dimethyl ammonium chloride, polyvinyl pyrrolidone, polyoxyethylene, polyvinyl acetate, polyvinylcyanoethyl ether, hydroxyethyl cellulose, cellulose sulfate, amylopectin, polyethylene glycol monomethyl ether and polyethylene glycol tert-octylphenyl ether, and polyvinyl pyrrolidone is more preferred, but not always limited thereto.

The amine compound herein is exemplified by propylamine, butylamine, hexylamine, heptylamine, octylamine, decylamine, dodecylamine, octadecylamine and oleylamine is more preferred, but not always limited thereto.

The third step of the method of the present invention is to reduce the metal precursor by heating the carbon nanotube-metal precursor mixed solution. In this step, gas n the reactor is preferably replaced with inactive gas for example nitrogen, argon, etc. The above gas replacement is to prevent newly generated metal from being oxidized upon completion of the reduction and to prevent explosion by the reaction of synthesized metal and oxygen at high temperature. After replacing gas in the reactor with inactive gas, temperature of the mixed solution is raised to induce reduction. The reductive solvent of the present invention is not effective at room temperature, but temperature is raised to a certain degree, and it induces reduction. The temperature for heat treatment depends on the composition of a reductive solvent, so the temperature is not limited to a specific range, but is preferably regulated in the range of 80~300° C. If the temperature is lower than 80° C., reduction is not successful, resulting in unsatisfactory metal particle formation. On the contrary, if the temperature is over 300° C., compounds of the mixed solution might be degraded and evaporated, suggesting that the reaction is unstable. Besides, if the reaction temperature is too high, it is disadvantageous economically.

After the third step of the method of the present invention, the method can additionally include the steps of filtering, washing and drying.

FIGS. 1, 2, 4, and 6 are SEM photographs of the carbon nanotube-metal composite prepared by the method of the present invention. The carbon nanotube-metal composite prepared by the method of the present invention demonstrates regular dispersion of metal particles, even size of metal particles that is 20 nm-100 nm, and round shape of metal particles bound to carbon nanotube. FIG. 3 illustrates the result of Differential Thermal Analysis (DTA) with the carbon nanotube-silver composite produced by the method of the present invention, which confirmed that if the metal particle size becomes smaller to nano size, melting point of the metal (silver herein) becomes lower to 150° C. from its original melting point of 960° C.

DESCRIPTION OF DRAWINGS

The above and other objects, features and advantages of the present invention will become apparent from the following description of preferred embodiments given in conjunction with the accompanying drawings, in which.

BEST MODE

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Figure 1:
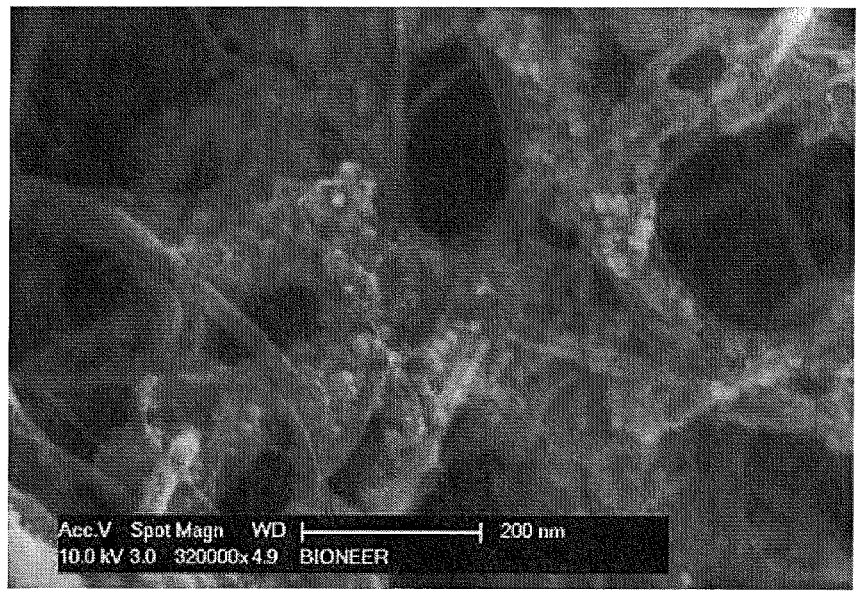
FIG. 1 is a SEM photograph of the carbon nanotube-silver composite prepared in Example 1.

Preparation of Carbon Nanotube-Silver Composite Using Thin Multi Wall Carbon Nanotube 0.3 g of thin multi wall carbon nanotube (Nanotech, Thin Multi-wall CNT grade) was loaded in a 500 ml round flask reactor, to which 280 ml of ethylene glycol (EG) was added, followed by stirring for 30 minutes using a stirrer. The reactor was put in an ultrasonic cleaner, followed by dispersion of carbon nanotube in ethylene glycol for 3 hours using ultrasonic waves. The temperature of the reactor was regulated under 50° C. Upon completion of the ultrasonication, a stirrer was attached to the reactor again and a thermometer and a condenser for cooling were connected. While stirring the reactor, 1.68 g of PVP (Poly vinylpyrrolidone, Fluka, Mw: 40,000) and 5.6 ml of oleylamine were added, to which 1.102 g of Silver Nitrate ($AgNO_3$) was added stepwise. Vacuum pump was connected to the reactor to replace air in the reactor with nitrogen. While supplying nitrogen continuously, nitrogen was forced to circulate in the inside of the reactor to prevent oxygen inflow. Mantle was equipped to the bottom of the flask and temperature of the reactor was raised to 200° C. for 40 minutes, followed by reaction for one hour. Upon completion of reduction, temperature of the reactor was lowered slowly to room temperature for 3 hours. The generated carbon nanotube-silver composite was filtered with a filter paper, followed by washing with ethyl acetate and hexane several times. The prepared carbon nanotube-silver composite was analyzed by SEM. As a result, silver nano particles were round in shape, 20 nm in size and dispersed evenly (FIG. 1).

EXAMPLE 2

Figure 2:
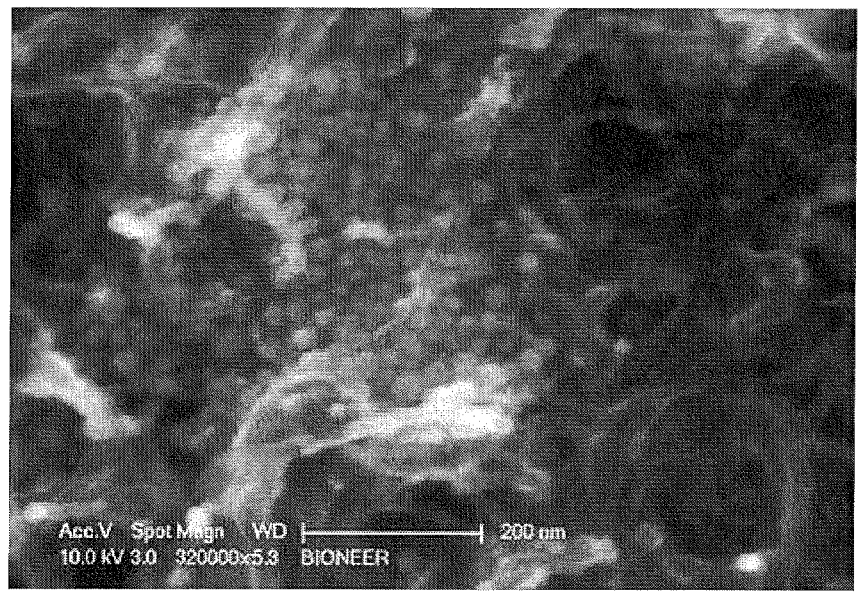
FIG. 2 is a SEM photograph of the carbon nanotube-silver composite prepared in Example 3.
Figure 3:
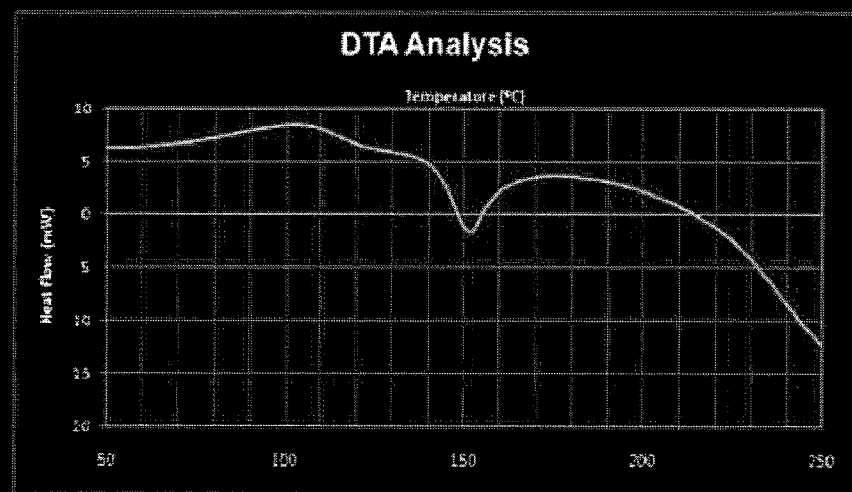
FIG. 3 is a graph showing the spectrum of Differential Thermal Analysis (DTA) of the carbon nanotube-silver composite prepared in Example 3.

Preparation of Carbon Nanotube-Silver Composite Using Multi Wall Carbon Nanotube Carbon nanotube-silver composite was prepared by the same manner as described in Example 1 except that multi wall carbon nanotube (Hanwha Nanotech, Multi-Wall CNT; CM-95 grade) was used as carbon nanotube. The prepared carbon nanotube-silver composite was analyzed by SEM. As a result, silver nano particles were round in shape, 20 nm in size and dispersed evenly (FIG. 2). From the result of Differential Thermal Analysis (DTA) with the prepared carbon nanotube-silver composite, as shown in FIG. 3, it was confirmed that the melting point of silver was 150° C.

EXAMPLE 3

Change of the Metal Particle Size According to the Amount of a Stabilizer

Carbon nanotube-silver composite was prepared by the same manner as described in Example 1 except that multi wall carbon nanotube (Hanwha Nanotech, Multi-Wall CNT; CM-95 grade) was used as carbon nanotube and 1.68 g of PVP (Poly vinylpyrrolidone) and 2.8 ml of oleylamine were added as a stabilizer. The prepared carbon nanotube-silver composite was analyzed by SEM. As a result, silver particles were round in shape, 30 nm in size and dispersed evenly. From the result of Differential Thermal Analysis (DTA) with the prepared carbon nanotube-silver composite, it was confirmed that the melting point of silver was 170° C.

example 4

Preparation of Carbon Nanotube-Zinc Composite 0.3 g of multi wall carbon nanotube (Hanwha Nanotech, CM-95) was loaded in a 500 ml round flask reactor, to which 280 ml of triethylene glycol (TEG) was added, followed by stirring for 30 minutes using a stirrer. The reactor was put in an ultrasonic cleaner, followed by dispersion of carbon nanotube in triethylene glycol for 3 hours using ultrasonic waves. The temperature of the reactor was regulated under 50° C. Upon completion of the ultrasonication, a stirrer was attached to the reactor again and a thermometer and a condenser for cooling were connected. While stirring the reactor, 6.39 ml of methyl polyglycol (MPG, $CH_3(OCH_2CH_2)_nOH$, n=4~5, Hannong Chemicals Inc., Product Name: MPG), 1.68 g of PVP (Polyvinylpyrrolidone, Fluka, Mw: 40,000) and 2.82 g of zinc acetylacetonate were added thereto stepwise. Vacuum pump was connected to the reactor to replace air in the reactor with nitrogen. While supplying nitrogen continuously, nitrogen was forced to circulate in the inside of the reactor to prevent oxygen inflow. Mantle was equipped to the bottom of the flask and temperature of the reactor was raised to 290° C. for one hour, followed by reaction for 3 hours. Upon completion of reduction, temperature of the reactor was lowered slowly to room temperature for 3 hours. The generated carbon nanotube-zinc composite was filtered with a filter paper, followed by washing with ethyl acetate and hexane several times. The prepared carbon nanotube-zinc composite was analyzed by SEM.

Figure 4:
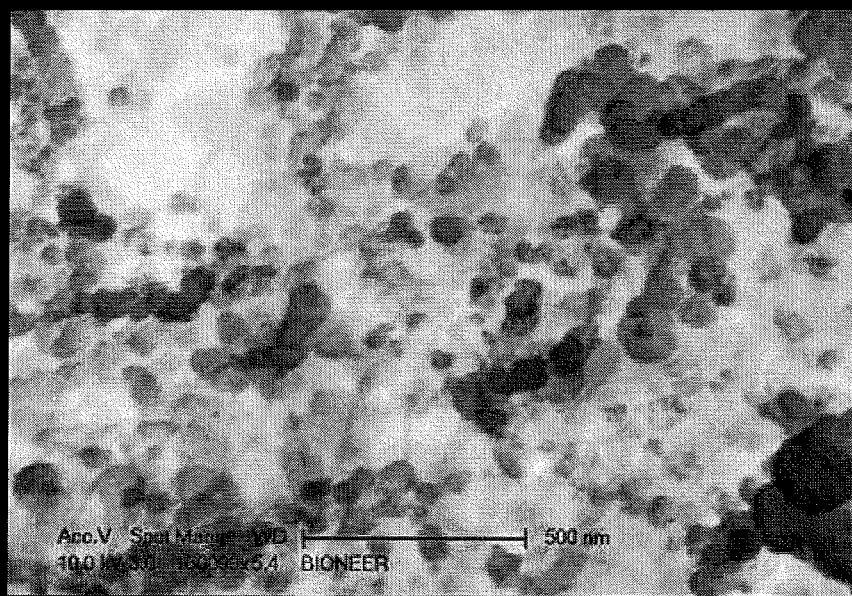
FIG. 4 is a SEM photograph of the carbon nanotube-zinc composite prepared in Example 4.

As a result, zinc particles were 50-100 nm in size and dispersed evenly (FIG. 4).

EXAMPLE 5

Figure 5:
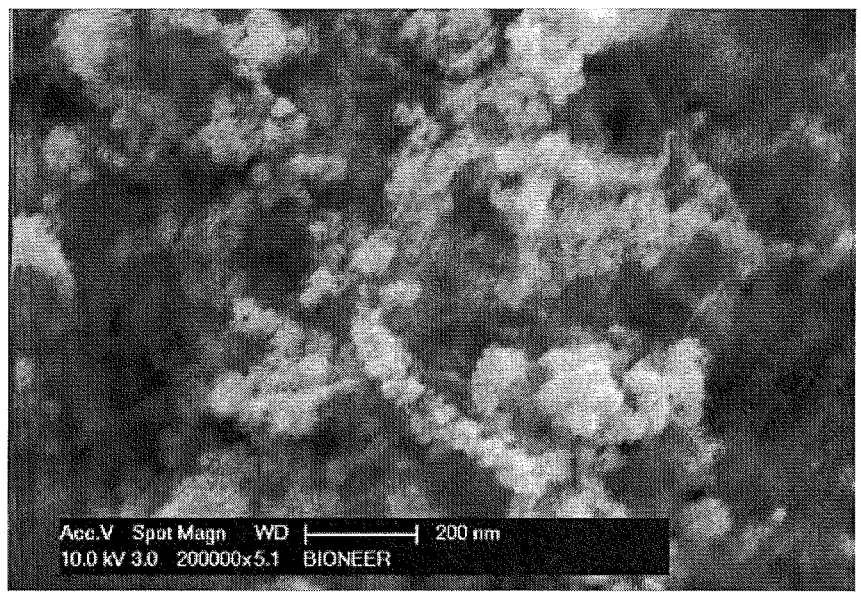
FIG. 5 is a SEM photograph of the carbon nanotube-manganese composite prepared in Example 5.

Preparation of Carbon Nanotube-Manganese Composite 0.3 g of multi wall carbon nanotube (Hanwha Nanotech, CM-95) was loaded in a 500 ml round flask reactor, to which 280 ml of triethylene glycol (TEG) was added, followed by stirring for 30 minutes using a stirrer. The reactor was put in an ultrasonic cleaner, followed by dispersion of carbon nanotube in triethylene glycol for 3 hours using ultrasonic waves. The temperature of the reactor was regulated under 50° C. Upon completion of the ultrasonication, a stirrer was attached to the reactor again and a thermometer and a condenser for cooling were connected. While stirring the reactor, 1.68 g of PVP (Polyvinylpyrrolidone, Fluka, Mw: 40,000) and 5.35 g of manganese acetate were added thereto stepwise. Vacuum pump was connected to the reactor to replace air in the reactor with nitrogen. While supplying nitrogen continuously, nitrogen was forced to circulate in the inside of the reactor to prevent oxygen inflow. Mantle was equipped to the bottom of the flask and temperature of the reactor was raised to 290° C. for one hour, followed by reaction for 2 hours. Upon completion of reduction, temperature of the reactor was lowered slowly to room temperature for 3 hours. The generated carbon nanotube-manganese composite was filtered with a filter paper, followed by washing with ethyl acetate and hexane several times. The prepared carbon nanotube-manganese composite was analyzed by SEM. As a result, manganese particles were 50 nm in size and dispersed evenly (FIG. 5).

EXAMPLE 6

Preparation of Carbon Nanotube-Aluminum Composite 0.3 g of multi wall carbon nanotube (Hanwha Nanotech, CM-95) was loaded in a 500 ml round flask reactor, to which 280 ml of triethylene glycol (TEG) was added, followed by stirring for 30 minutes using a stirrer. The reactor was put in an ultrasonic cleaner, followed by dispersion of carbon nanotube in triethylene glycol for 3 hours using ultrasonic waves. The temperature of the reactor was regulated under 50° C. Upon completion of the ultrasonication, a stirrer was attached to the reactor again and a thermometer and a condenser for cooling were connected. While stirring the reactor, 10.0 ml of methyl polyglycol (MPG, $CH_3(OCH_2CH_2)_nOH$, n=4~5, Hannong Chemicals Inc., Product Name: MPG), 1.68 g of PVP (Polyvinylpyrrolidone, Fluka, Mw: 40,000), 2.8 ml of oleylamine and 32.45 g of aluminum acetylacetonate were added thereto stepwise. Vacuum pump was connected to the reactor to replace air in the reactor with nitrogen. While supplying nitrogen continuously, nitrogen was forced to circulate in the inside of the reactor to prevent oxygen inflow. Mantle was equipped to the bottom of the flask and temperature of the reactor was raised to 290° C. for one hour, followed by reaction for 2 hours. Upon completion of reduction, temperature of the reactor was lowered slowly to room temperature for 3 hours.

Figure 6:
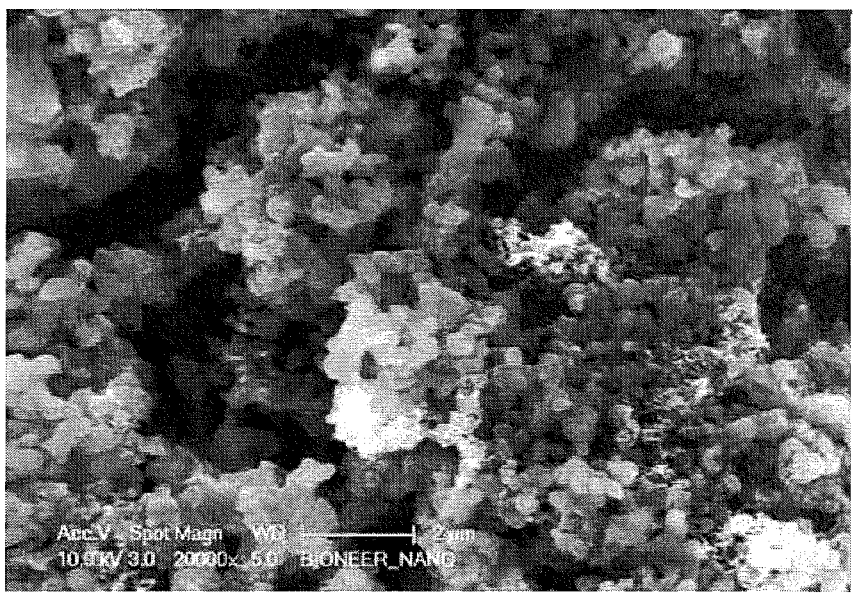
FIG. 6 is a SEM photograph of the carbon nanotube-aluminum composite prepared in Example 6.

The generated carbon nanotube-aluminum composite was filtered with a filter paper, followed by washing with ethyl acetate and hexane several times. The prepared carbon nanotube-aluminum composite was analyzed by SEM. As a result, aluminum particles were 100 nm in size and dispersed evenly (FIG. 6).

[Industrial Applicability]

As explained hereinbefore, the method for preparing a carbon nanotube-metal composite of the present invention uses low-priced polyol, glycol ether or a mixture thereof as a reducing agent. As a result, nano-sized metal particles are evenly dispersed in carbon nanotube and the size of a metal particle can be regulated smaller and more regular. In addition, the method of the present invention facilitates the production of diverse carbon nanotube-metal composites in which metal particles are evenly dispersed and bound. The carbon nanotube-metal composite prepared by the method of the present invention can be applied as a material in the field of electronic industry including electron emitter of field emission display and electronic ink, and as a material for high strength lightweight structure.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for preparing a carbon nanotube-metal composite comprising:
   preparing a dispersion solution by dispersing carbon nanotube in a reductive solvent, the reductive solvent being a mixture of polyhydric alcohol and glycol ethers;
   preparing a mixed solution by adding a stabilizer and a metal precursor to the dispersion solution;
   reducing the metal precursor by heating the mixed solution at 80-300° C. to obtain a carbon nanotube-metal composite where metal particles of 5-200 nm are bound to the carbon nanotube, and
   separating the carbon nanotube-metal composite from the mixed solution by filtering and washing the mixed solution,
   wherein the stabilizer is a mixture of hydrophilic polymer and amines, and the weight ratio of stabilizer to metal precursor is 1:0.01-50.

2. The method for preparing a carbon nanotube-metal composite according to claim 1, wherein the polyhydric alcohol is selected from the group consisting of glycols represented by Formula 1, glycerin, threitol, arabitol, glucose, mannitol, galactitol and sorbitol, and the glycol ethers are selected from the compounds represented by Formula 2,

H—(OR¹)ₙ—OH     [Formula 1]

R⁴—(OR²)ₘ—OR³     [Formula 2]

wherein
$R^1$ and $R^2$ are independently selected from $C_2$-$C_{10}$ linear or branched alkylene; $R^3$ represents a hydrogen atom, allyl, $C_1$-$C_{10}$ alkyl, $C_5$-$C_{20}$ aryl or $C_6$-$C_{30}$ aralkyl; $R^4$ represents allyl, $C_1$-$C_{10}$ alkyl, $C_5$-$C_{20}$ aryl, $C_6$-$C_{30}$ aralkyl group or $C_2$-$C_{10}$ alkylcarbonyl group; alkyl of the alkylcarbonyl group includes a double bond in its carbon chain; and n and m independently represent integers of 1 to 100.

3. The method for preparing a carbon nanotube-metal composite according to claim 2, wherein the glycols are selected from the group consisting of ethylene glycol, diethylene glycol, triethylene glycol, tetraethylene glycol, polyethylene glycol, propylene glycol, dipropylene glycol, polypropylene glycol and hexylene glycol, and the glycol ethers are selected from the group consisting of methyl glycol, methyl diglycol, methyl triglycol, methyl polyglycol, ethyl glycol, ethyl diglycol, butyl glycol, butyl diglycol, butyl triglycol, butyl polyglycol, hexyl glycol, hexyl diglycol, ethyl hexyl glycol, ethyl hexyl diglycol, aryl glycol, phenyl glycol, phenyl diglycol, benzil glycol, benzil diglycol, methyl propylene glycol, methyl propylene diglycol, methyl propylene triglycol, propyl propylene glycol, propyl propylene diglycol, butyl propylene glycol, butyl propylene diglycol, phenyl propylene glycol and methyl propylene glycol acetate.

4. The method for preparing a carbon nanotube-metal composite according to claim 1, wherein the hydrophilic polymer is selected from the group consisting of polyethylene glycol, polyvinyl alcohol, polyacrylic acid, polymethacrylic acid, polyacrylamide, polyvinyl sulfonic acid, polydiallyl dimethyl ammonium chloride, polyvinyl pyrrolidone, polyoxyethylene, polyvinyl acetate, polyvinylcyanoethyl ether, hydroxyethyl cellulose, cellulose sulfate, amylopectin, polyethylene glycol monomethyl ether, polyethylene glycol tert-octylphenyl ether and a mixture thereof.

5. The method for preparing a carbon nanotube-metal composite according to claim 1, wherein the amines are selected from the group consisting of primary amine, secondary amine, tertiary amine, aromatic amine or a mixture thereof.

6. The method for preparing a carbon nanotube-metal composite according to claim 5, wherein the amines are selected from the group consisting of propylamine, butylamine, hexylamine, heptylamine, octylamine, decylamine, dodecylamine, octadecylamine, oleylamine and a mixture thereof.

7. The method for preparing a carbon nanotube-metal composite according to claim 1, wherein the metal precursor is selected from the group consisting of the compounds containing a metal component selected among Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Al, Ga, In, Sn, Ti, Pb and Bi and a mixture thereof.

8. The method for preparing a carbon nanotube-metal composite according to claim 7, wherein the metal precursor is one or more compounds selected from the group consisting of a hydroxyl compound, a carbonate compound, a chloride compound, a nitrate compound, a carboxylate compound represented by Formula 3, a β-diketonate compound represented by Formula 4, and hydrates thereof,

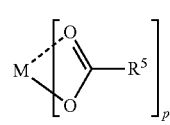
[Formula 3]

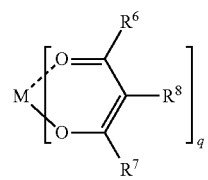
[Formula 4]

wherein

M is selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Al, Ga, In, Sn, Tl, Pb and Bi; $R^5$, $R^6$ and $R^7$ independently represent allyl, $C_1$~$C_{10}$ alkyl, $C_5$~$C_{20}$ aryl or $C_6$~$C_{30}$ aralkyl; $R^8$ is selected from a hydrogen atom or $C_1$~$C_7$ alkyl; and p and q independently represents a valence of M.

9. The method for preparing a carbon nanotube-metal composite according to claim 7, wherein the metal component (M) is selected from the group consisting of Ag, Mn, Al and Zn.

10. The method for preparing a carbon nanotube-metal composite according to claim 7, wherein the metal precursor is selected from the group consisting of silver nitrate, silver acetylacetonate, silver acetate, silver carbonate, silver chloride, aluminum hydroxide, aluminum chloride, aluminum acetylacetonate, aluminum acetate, aluminum nitrate, manganese carbonate, manganese chloride, manganese nitrate, manganese acetylacetonate, manganese acetate, zinc chloride, zinc nitrate, zinc acetate, zinc acetylacetonate and hydrates thereof.

\* \* \* \* \*